US007800872B2

(12) United States Patent
Arioka et al.

(10) Patent No.: US 7,800,872 B2
(45) Date of Patent: Sep. 21, 2010

(54) SWITCH-STATE MONITORING DEVICE

(75) Inventors: Masahiro Arioka, Tokyo (JP); Yasushi Takeuchi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 279 days.

(21) Appl. No.: 12/158,545

(22) PCT Filed: Mar. 20, 2006

(86) PCT No.: PCT/JP2006/305555

§ 371 (c)(1),
(2), (4) Date: Jun. 20, 2008

(87) PCT Pub. No.: WO2005/111641

PCT Pub. Date: Nov. 24, 2005

(65) Prior Publication Data

US 2009/0267714 A1 Oct. 29, 2009

(51) Int. Cl.
*H02H 5/04* (2006.01)

(52) U.S. Cl. ............................ 361/28; 361/89; 361/94; 361/23; 361/24; 361/25; 361/27

(58) Field of Classification Search .................. 361/28, 361/89, 94; 307/41; 318/434, 432
See application file for complete search history.

(56) References Cited

U.S. PATENT DOCUMENTS 3,629,744 A * 12/1971 Maier et al. .................. 335/89
3,654,535 A * 4/1972 Hendry et al. ............. 318/267
3,808,503 A * 4/1974 Hentschel .................... 361/30
4,028,736 A * 6/1977 Willson et al. ................ 361/29
5,784,232 A * 7/1998 Farr .......................... 361/22
6,055,144 A * 4/2000 Reid .......................... 361/64
6,144,235 A * 11/2000 Marano et al. ............. 327/110
6,396,228 B2 * 5/2002 Guille et al. ................ 318/434
2002/0100674 A1 * 8/2002 Rosen et al. ................ 200/400

FOREIGN PATENT DOCUMENTS

JP 5-159686 A 6/1993
JP 10-112237 A 4/1998
JP 2003-308751 A 10/2003
JP 2004-192441 A 7/2004
WO WO 2005/111641 11/2005

OTHER PUBLICATIONS

International Search Report, May 2006.

* cited by examiner

*Primary Examiner*—Rita Leykin
(74) *Attorney, Agent, or Firm*—Buchanan Ingersoll & Rooney PC

(57) ABSTRACT

Provision is made for a switch-state monitoring device that not only monitors the state of a switch but also prevents a motor burnout. A switch-state monitoring device for a switch that opens and closes a main circuit by use of a motor is provided with an operating time measuring unit for detecting an operating time for the motor when the switch is opened or closed; a first determination unit for comparing an operating time for the motor detected by the operating time measuring unit with an continuous-operating-capable setting time for the motor and determining whether or not the operating time for the motor has exceeded the continuous-operating-capable setting time; a protection device for halting energization of the motor in the case where, based on an output of the first determination unit, it is determined that the operating time for the motor has exceeded the continuous-operating-capable setting time.

8 Claims, 6 Drawing Sheets

SWITCH-STATE MONITORING DEVICE

TECHNICAL FIELD

The present invention relates to a switch-state monitoring device utilized in electric-power transmission/distribution facilities and electric-power reception facilities, and more particularly to a switch-state monitoring device suitable for monitoring the state of the operation characteristics of a switch, such as a disconnecting switch or an earthing switch, that opens and closes a main circuit by use of a motor.

BACKGROUND ART

A conventional switch-operation-characteristic monitoring device disclosed in Patent Document 1 is provided with an operation-time detection means for detecting the operation time of a switch; a parameter detection means for detecting the values of parameters that affect the operation time of the switch; an operation-time correction means for correcting the detection time of the operation-time detection means in accordance with the difference between the value detected by the parameter detection means and the reference value for the parameter; and a determination means for determining whether or not the operation time of the switch is abnormal, by comparing an setting value that serves as a reference value for the operation time of the switch and the operation time corrected by the operation-time correction means.

(Patent Document 1) Japanese Patent Laid-Open No. 2003-308751

DISCLOSURE OF THE INVENTION

Meanwhile, in the case a conventional monitoring device of this kind is applied to a state monitoring device for monitoring the state of the operation characteristics of a switch in which the moving body of a main circuit is driven by use of a motor, an abnormality in the switch can be detected, by monitoring the operation time of the switch; however, there has been a problem that, in the case where, due to gnawing in the moving body of the switch or depletion of grease, the motor is locked, the energization of the motor continues, whereby the motor burns out due to the continuous energization of the motor.

In consideration of the foregoing problem, the present invention provides a switch-state monitoring device that not only monitors the state of a switch but also prevents a motor burnout.

A switch-state monitoring device, according to the present invention, for a switch that opens and closes a main circuit by use of a motor is provided with an operating time measuring means for detecting an operating time for the motor when the switch is opened or closed; a first determination means for comparing an operating time for the motor detected by the operating time measuring means with an continuous-operating-capable setting time for the motor and determining whether or not the operating time for the motor has exceeded the continuous-operating-capable setting time; a protection means for halting energization for the motor, in the case where, based on an output of the first determination means, it is determined that the operating time for the motor has exceeded the continuous-operating-capable setting time; a second determination means for determining whether or not the operating time for the motor detected by the operating time measuring means has fallen outside an setting range with which it is determined whether or not an abnormality exists in the switch; and an output means for outputting an abnormality in the switch in the case where, based on an output of the second determination means, it is determined that the operating time for the motor has fallen outside the setting range.

Moreover, in the switch-state monitoring device according to the present invention, in the case where the operating time for the motor detected by the operating time measuring means has fallen outside the setting range with which it is determined whether or not an abnormality exists in the switch, the second determination means determines whether the operating time has exceeded the upper limit value or the lower limit value of the setting range; and an abnormal unit discrimination means discriminates an abnormal unit in the switch, based on the output of the second determination means.

A switch-state monitoring device, according to the present invention, for a switch that opens and closes a main circuit by use of a motor is provided with an operating current detection means for detecting an operating current for the motor when the switch is opened or closed; a first determination means for comparing an operating current for the motor detected by the operating current detection means with an operating-capable setting current value for the motor and determining whether or not the operating current for the motor has exceeded the operating-capable setting current value; a protection means for halting energization for the motor, in the case where, based on an output of the first determination means, it is determined that the operating current for the motor has exceeded the operating-capable setting current value; a second determination means for determining whether or not the operating current for the motor detected by the operating current detection means has fallen outside an setting range with which it is determined whether or not an abnormality exists in the switch; and an output means for outputting an abnormality in the switch in the case where, based on an output of the second determination means, it is determined that the operating current for the motor has fallen outside the setting range.

Moreover, in the switch-state monitoring device according to the present invention, in the case where an operating current for the motor detected by the operating current detection means has fallen outside the setting range with which it is determined whether or not an abnormality exists in the switch, the second determination means determines whether the operating current has exceeded the upper limit value or the lower limit value of the setting range; and an abnormal unit discrimination means discriminates an abnormal unit in the switch, based on the output of the second determination means.

In a switch-state monitoring device according to the present invention, because, in the case where an operating time for a motor exceeds the continuous-operating-capable setting time for the motor, energization for the motor is halted, a burnout of the motor can be prevented, and because, in the case where an operating time for a motor falls outside an setting range with which it is determined whether or not an abnormality exists in a switch, the abnormality in the switch is outputted, an abnormality in each different unit of the switch can be detected.

Moreover, in a switch-state monitoring device according to the present invention, because, in the case where an operating current for a motor exceeds the operating-capable setting current value for the motor, energization for the motor is halted, a burnout of the motor can be prevented, and because, in the case where an operating current for a motor falls outside an setting range with which it is determined whether or not an abnormality exists in a switch, the abnormality in the switch is outputted, an abnormality in each different unit of the switch can be detected.

BEST MODE FOR CARRYING OUT THE INVENTION

Embodiment 1

A switch-state monitoring device according to the present invention will be explained with reference to the drawings. FIG. 1 is a block diagram illustrating a switch-state monitoring device according to Embodiment 1 of the present invention. In FIG. 1, the switch-state monitoring device is applied, for example, to a disconnecting switch 1 as a switch, in which a three-phase main circuit is opened and closed through a motor; the switch-state monitoring device is configured in such a way as to determine whether or not an abnormality exists and localize a unit with an abnormality, when the disconnecting switch 1 is opened or closed. The disconnecting switch 1 is provided with a motor 10, motor-operation-circuit switches 11*a* and 11*b*, an auxiliary a-contact 12*a*, an auxiliary b-contact 12*b*, and a temperature sensor 15.

The motor 10 is connected in series to the motor-operation-circuit switch 11*a* or 11*b*, thereby being connected between the power-source terminals of an operation power source 2; when a contact closing button 13*a* is closed, a contact closing coil 110*a* of the motor-operation-circuit switch 11*a* is excited, so that the motor-operation-circuit switch 11*a* is closed and the motor 10 is activated. In addition, reference character 13*c* is a self-holding contact that responds to the contact closing button 13*a*. Reference numeral 6 denotes a control power source. When the motor 10 is activated, a moving body (unillustrated), for the main circuit in the disconnecting switch 1, which is mechanically connected to the motor 10 is driven, so that the disconnecting switch 1 is driven in a contact-closing direction and the main contact of the disconnecting switch 1 is closed.

When the main contact of the disconnecting switch 1 is closed, the auxiliary b-contact 12*b* is opened and the contact closing coil 110*a* of the motor-operation-circuit switch 11*a* becomes unenergized, so that the self-holding contact 13*c* and the motor-operation-circuit switch 11*a* are opened, whereby the motor 10 stops. At this time, the auxiliary a-contact 12*a*, connected in series to a opening coil 10*b* of the motor-operation-circuit switch 11*b*, is closed. After that, a current flowing through the motor 10 is detected by a current transformer 14 inserted in the circuit for the motor 10; the detected current is supplied to a measuring unit 3.

In contrast, when a opening button 13*b* is closed, the opening coil 110*b* of the motor-operation-circuit switch 11*b* is excited, so that the motor-operation-circuit switch 11*b* is closed and the motor 10 is activated in a direction that is opposite to the direction when the disconnecting switch is closed. In addition, reference character 13*d* denotes a self-holding contact that responds to the contact closing button 13*b*. When the motor 10 is activated, the moving body (unillustrated), for the main circuit in the disconnecting switch 1, which is mechanically connected to the motor 10 is driven in a opening direction, so that the main contact of the disconnecting switch 1 is opened. When the main contact of the disconnecting switch 1 is opened, the auxiliary a-contact 12*a* is opened and the opening coil 110*b* of the motor-operation-circuit switch 11*b* becomes unenergized, so that the self-holding contact 13*d* and the motor-operation-circuit switch 11*b* are opened, whereby the motor 10 stops. At this time, the auxiliary b-contact 12*b*, connected in series to the contact closing coil 110*a* of the motor-operation-circuit switch 11*a*, is closed.

After that, a current flowing through the motor 10 is detected by the current transformer 14 inserted in the circuit for the motor 10; the detected current is supplied to the measuring unit 3. Additionally, the opening and closing states of the motor-operation-circuit switches 11*a* and 11*b* that detect the fact the motor 10 is activated or stopped is supplied to the measuring unit 3. In addition, the state monitoring device has the measuring unit 3, a correction unit 4, and a determination unit 5. In the case where the determination unit 5 determines that it is required to stop the motor 10, an abnormality stop contact 16 provided in the disconnecting switch 1 is opened so as to render an abnormality stop coil 17, connected to the abnormality stop contact 16, unenergized. As a result, an abnormality stop switch 17*b*, connected to the contact closing coils 110*a* and 110*b* of the motor-operation-circuit switches 11*a* and 11*b*, is opened, thereby rendering the contact closing coils 110*a* and 10*b* of the motor-operation-circuit switches 11*a* and 11*b* unenergized; thus, the motor-operation-circuit switches 11*a* and 11*b* connected to the motor 10 are opened, so that the motor 10 is separated from the power source 2, whereby the supply of electric power to the motor 10 is stopped.

In this situation, as represented in FIG. 2, in the case where, when the disconnecting switch 1 is normally closed, the contact 11*a* closes in response to a closing command, the motor 10 is activated and then a rising current 10*a* flows. When the motor 10 is activated and the moving body of the disconnecting switch 1 is driven in the contact closing direction, an operating current flowing through the motor 10 decreases to an operating current 10*b* with which load force, which is produced, for example, due to friction of the moving body of the disconnecting switch 1, can be driven, and then the motor 10 is driven up to a position 10*p* at which the main-circuit contact of the disconnecting switch 1 makes contact. After the main-circuit contact of the disconnecting switch makes contact, frictional force at the main-circuit contact of the disconnecting switch 1 is added to the load force, produced due to friction of the moving body of the disconnecting switch 1 or the like; therefore, the load imposed on the motor 10 increases, whereby an operating current 10*c* for the motor 10 also increases.

Because, in Embodiment 1, a peak value $I_1$ of the rising current 10*a* is determined mainly by the DC resistance value of the motor 10 and the power-source voltage, the value of the power-source voltage is calculated based on the peak value $I_1$ of the rising current 10*a*. In addition, the operating time for the motor 10 is detected by measuring a time $(T_1+T_2)$ during which the motor-operation-circuit switches 11*a* and 11*b* are closed; further, as a means for detecting a change in load force exerted on the motor 10, the operating current for the motor 10 is detected by use of the current transformer 14 inserted in the circuit for the motor 10 so that the change in load force, exerted on the motor 10, which consists of driving forces and frictional forces at the moving body and the main-circuit contact is detected.

By detecting the change in the operating current for the motor 10 being driven, the operating time for the motor 10 can be detected as the combination of an operating time $T_1$ between the time instant when the motor 10 is activated and the time instant when the main-circuit contact makes contact and an operating time $T_2$ between the time instant when the main-circuit contact makes contact and the time instant when the motor 10 stops. During the operating time $T_1$ between the time instant when the motor 10 is activated and the time instant when the main-circuit contact makes contact, a change in the frictional force at the moving body of the disconnecting switch 1 can be detected based on a change in the operating time $T_1$ and an accompanying change in an operating current $I_2$.

That is to say, as represented in FIG. 3, during the operating time $T_l$, the fact that the operating time $T_1$ or the operating current $I_2$ becomes larger than an initial value suggests that the frictional force at the moving body of the disconnecting switch 1 has become larger than an initial value. In the case where the operating time $T_1$ or the operating current $I_2$ exceeds a first setting range, it is required to perform repair and maintenance of the portion, of the moving body of the disconnecting switch 1, at which the frictional force has increased. In contrast, the fact that the operating time $T_1$ or the operating current $I_2$ decreases in such a way as to fall outside the first setting range suggests that the frictional force at the moving body of the disconnecting switch 1 has extremely decreased; thus, it is suggested that, for example, due to disconnection of a coupling pin that couples the motor 10 through the moving body, normal coupling is not performed; therefore, it is required to ascertain the state of coupling from the motor 10 through the main-circuit moving body and to perform repair and maintenance thereof.

In addition, as represented in FIG. 4, during the operating time $T_2$ between the time instant when the main-circuit contact of the disconnecting switch 1 makes contact and the time instance when the motor 10 stops, a change in the frictional force at the main-circuit contact of the disconnecting switch 1 can be detected based on a change in the operating time $T_2$ or a change in an operating current $I_3$. That is to say, the fact that the operating time $T_2$ or the operating current $I_3$ becomes larger than an initial value suggests that the frictional force at the main-circuit contact of the disconnecting switch 1 has become larger than an initial value; thus, in the case where the operating time $T_2$ or the operating current $I_3$ exceeds a second setting range, it is required to perform repair and maintenance of the portion, of the main-circuit contact of the disconnecting switch 1, at which the frictional force has increased. In contrast, the fact that the operating time $T_2$ or the operating current $I_3$ decreases in such a way as to fall outside the second setting range suggests that the frictional force at the main-circuit contact of the disconnecting switch 1 has extremely decreased; thus, it is suggested that the main circuit does not make normal contact; therefore, it is required to ascertain the main-circuit contact of the disconnecting switch 1 and to perform repair and maintenance thereof.

Additionally, in the case where the operating time $(T_1+T_2)$ for the motor 10 exceeds the first setting value (continuous-operating-capable setting time) that is an abnormal value of the operating time or in the case where the operating current during the operating time $(T_1+T_2)$ exceeds the second setting value (operating-capable setting current value) that is an abnormal value of the operating current, the determination unit 5 determines that an abnormality exists; then, the abnormality stop coil 17 in the disconnecting switch 1 is rendered unenergized so that the circuits of the contact closing coil 110*a* and the opening coil 110*b* for the motor-operation-circuit switches 11*a* and 11*b* are opened, whereby the contact closing coil 110*a* and the opening coil 10*b* are rendered unenergized; thus, the motor-operation-circuit switches 11*a* and 11*b* connected to the motor 10 are opened, whereby the motor 10 and the operation power source 2 are separated, so that the supply of electric power to the motor 10 is halted, thereby preventing heat generation and a burnout in the motor 10.

In addition, in the foregoing description, the operating times $T_1$ and $T_2$ and the operating currents $I_2$ and $I_3$ for the motor in the case where the switch is closed are described in detail; however, the operating times and the operating currents for the motor in the case where the switch is opened can be considered in the same way. The time between the time instant when the switch opening operation starts and the time instant when the moving body and the fixed body of the main circuit are separated, i.e., an operating time $T_3$ (corresponding to the operating time $T_2$) between the time instant when the switch opening operation starts and the time instant when, due to the separation of the moving body from the fixed body of the main circuit, the load decreases and the operating current for the motor decreases or an operating current $I_4$ (corresponding to the operating current $I_3$) and the second setting range are compared in the same way for making a determination. In the case where the operating time $T_3$ or the operating current $I_4$ falls outside the setting range, the determination "an abnormality in the switch" is outputted.

The time between the time instant when the main-circuit moving body and fixed body are separated and the time instant when the operation of the motor is completed, i.e., an operating time $T_4$ (corresponding to the operating time $T_1$) between the time instant when, due to the separation of the main-circuit moving body from the fixed body, the load decreases and the operating current for the motor decreases and the time instant when the operation of the motor is completed or an operating current $I_5$ (corresponding to the operating current $I_2$) and the first setting range are compared in the same way for making a determination. In the case where the operating time $T_4$ or the operating current $I_5$ falls outside the setting range, the determination "an abnormality in the switch" is outputted. Moreover, it is determined in the same way whether or not the operating time $(T_3+T_4)$ for the motor exceeds the first setting value (continuous-operating-capable setting time) or whether or not the operating current during the operating time $(T_3+T_4)$ exceeds the second setting value (operating-capable setting current value) that is an abnormal value of the operating current. In the case where the operating time $(T_3+T_4)$ exceeds the first setting value or in the case where the operating current during the operating time $(T_3+T_4)$ exceeds the second setting value, the motor 10 and the operation power source 2 are separated so that the supply of electric power to the motor 10 is halted.

The operating times $T_1$ and $T_2$ and the operating currents $I_1$, $I_2$, and $I_3$ change in accordance with the ambient temperature, the power-source voltage supplied to the motor 10, and an operational interval, e.g., the time between the time instant when the disconnecting switch 1 closes and the time instant when the disconnecting switch 1 starts to open. FIG. 5 is a characteristic graph representing the relationship between the power-source voltage (operation voltage) V and the peak value $I_1$ (p.u.) (p.u.: percentage unit) of the rising current 10*a* when the motor 10 is activated. In FIG. 5, it can be seen that the operation voltage V and the operating current $I_1$ are approximately in a proportional relationship; this fact suggests that it is possible to calculate the power-source voltage V from the operating current $I_1$.

Additionally, FIG. 6 is a set of characteristic graphs representing the relationship between the ambient temperature (° C.) and the operating time $T_1$ (p.u.) between the time instant when the motor 10 is activated and the time instant when the main-circuit contact of the disconnecting switch 1 makes contact and the relationship between the ambient temperature (° C.) and the operating current $I_2$ (p.u.) during the operating time $T_1$. In FIG. 6, because, as the ambient temperature decreases, the resistance value of the motor 10 decreases, the operating current $I_2$ increases; in contrast to the operating current, the operating time $T_1$ is shortened as the ambient temperature decreases.

Meanwhile, FIG. 7 is a set of characteristic graphs representing the relationship between the operational interval (Hr) and the operating time $T_1$ (p.u.) between the time instant when the motor 10 is activated and the time instant when the main-circuit contact of the disconnecting switch 1 makes contact and the relationship between the operational time period (Hr) and the operating current $I_2$ (p.u.) during the operating time $T_1$. In FIG. 7, with regard to the operating current $I_2$ and the operating time $T_1$ when the operational interval is between 1 Hr and 10 Hr, in the case where the operational interval becomes longer than 1 Hr, the operating current $I_2$ decreases and the operating time $T_1$ increases, due to temperature rise caused by energization of the motor 10 when the motor 10 has immediately previously been activated. Additionally, it can be seen that, in the case where the operational interval exceeds 10 Hr, the fictional force at the moving body of the disconnecting switch 1 slightly increases, whereby the operating current $I_2$ and the operating time $T_1$ increase.

In accordance with the characteristics represented in FIGS. 5 to 7, the correction coefficients for the power-source voltage, the ambient temperature, and the operational interval are determined, based on the differences between the detected power-source voltage, the temperature detected by the temperature sensor 15, and the operational interval from the immediately previous operation (parameters that affect the operating time and the operating current for the motor) and the corresponding reference values (reference values of the parameters); in accordance with the correction coefficients for the power-source voltage, the ambient temperature, and the operational interval, the operating times $T_1$ and $T_2$ and the operating currents $I_2$ and $I_3$ are corrected; then, the corrected operating times $T_{11}$ and $T_{21}$ and the corrected operating currents $I_{21}$ and $I_{31}$ are obtained. For example, in accordance with the difference between the ordinary temperature 20° C. as the reference value of the ambient temperature and the temperature detected by the temperature sensor 15, the operating time and the operating current are corrected to be converted into values based on the reference values. Moreover, in accordance with the difference between the reference value of the power-source voltage, e.g., 100 V, and the detected power-source voltage, the operating time and the operating current are corrected to be converted into values based on the reference values. Furthermore, in accordance with the difference between the reference value of the operational interval, e.g., 1 Hr, and the detected operational interval, the operating time and the operating current are corrected to be converted into values based on the reference values.

Next, with reference to a flowchart represented in FIG. 8, a state diagnosis method for a state monitoring device in the case where the disconnecting switch 1 is in the contact closing operation will be explained. In the first place, each time the disconnecting switch 1 operates, signals related to the operation of the motor-operation-circuit switch 11*a*, a current detected by the current transformer 14, and a temperature detected by the temperature sensor 15 are sequentially received by the measuring unit 3 (the step 1). S1 to S13 are referred to as the steps 1 to 13, hereinafter. After that, it is determined whether or not all necessary data has been received (the step 2). For example, in the case where data for the current detected by the current transformer 14 is missing, an abnormality exists in the current transformer 14 or in the connection point between the current transformer 14 and the measuring unit 3; therefore, a determination that an abnormality exists in the device is made (the step 3) and the processing is ended. In the case where no abnormality exists in the detection data, it is determined whether or not the operating time ($T_1$+$T_2$) or the operating current exceeds the first setting value or the second setting value; in the case where the operating time ($T_1$+$T_2$) or the operating current exceeds the first setting value or the second setting value, a determination that an abnormality exists is made (the step 4, a first determination means), the motor 10 is halted, and then the processing is ended (the step 5, a protection means).

In contrast, in the case where no abnormality is found in the foregoing processing (the step 4), based on the detected power-source voltage (the voltage of the power source 2), the temperature detected by the temperature sensor 15, and the operational interval from the immediately previous operation, the correction coefficients for the power-source voltage, the ambient temperature, and the operational interval are determined in accordance with the characteristics represented in FIGS. 5 to 7 (the step 6); in accordance with the correction coefficients for the power-source voltage, the ambient temperature, and the operational interval, the operating times $T_1$ and $T_2$ and the operating currents $I_2$ and $I_3$ are corrected; then, the corrected operating times $T_{11}$ and $T_{21}$ and the corrected operating currents $I_{21}$ and $I_{31}$ are obtained (the step 7). After that, the corrected operating times $T_{11}$ and $T_{21}$ and the corrected operating currents $I_{21}$ and $I_{31}$ are each compared with the first setting range and the second setting range (the step 8, a second determination means); in the case where it is determined that each of the corrected operating times $T_{11}$ and $T_{21}$ and the corrected operating currents $I_{21}$ and $I_{31}$ falls within the first setting range and within the second setting range, it is determined that the disconnecting switch 1 functions normally (the step 9), the corrected operating times $T_{11}$ and $T_{21}$, and the corrected operating currents $I_{21}$ and $I_{31}$ are stored in relationship to the number of operations, and then the processing is ended.

In contrast, in the case where it is determined that any one of the corrected operating times $T_{11}$ and $T_{21}$ and the corrected operating currents $I_{21}$ and $I_{31}$ falls outside the setting ranges, a determination that an abnormality exists is outputted (the step 8), so that the abnormality is discriminated (the steps 10 to 13). That is to say, in the case where the operating time $T_{11}$ or the corrected operating current $I_{21}$ falls outside the first setting range, it is discriminated that an abnormality exists in the moving body of the disconnecting switch 1 (the steps 10 and 11); in the case where the operating time $T_{21}$ or the operating current $I_{31}$ falls outside the second setting range, it is discriminated that an abnormality exists in the main-circuit contact of the disconnecting switch 1 (the steps 10 and 12); in the case where the operating time $T_{11}$ or the operating current $I_{21}$ and the operating time $T_{21}$ or the operating current $I_{31}$, i.e., two or more parameters fall outside the first and second setting ranges, it is discriminated that an abnormality exists in the device of the disconnecting switch 1 (the steps 10 and 13); then, the corrected operating times $T_{11}$ and $T_{21}$ and the operating currents $I_{21}$ and $I_{31}$ are stored in relationship to the number of operations, and then the processing is ended. In addition, the abnormality recognition means is configures with the steps 10 to 13.

Additionally, in the foregoing description, it is determined in a comparison manner whether or not the corrected operating times $T_{11}$ and $T_{21}$ and the corrected operating currents $I_{21}$ and $I_{31}$ fall outside the first setting range and the second setting range; however, it goes without saying that, although the accuracy is slightly deteriorated, a method can be put to practical use in which it is determined in a comparison manner whether or not the uncorrected operating times $T_1$ and $T_2$ and the uncorrected operating currents $I_2$ and $I_3$ fall outside the first setting range and the second setting range.

As described above, in Embodiment 1, in the case where the operating time ($T_1$+$T_2$) or the operating current for the motor 10 exceeds the first setting value (continuous-operating-capable setting time) or the second setting value (operating-capable setting current value), the motor 10 is separated from the power source, so that abnormal heat generation and a burnout in the motor 10 can be prevented. Moreover, it is determined whether or not the state of the disconnecting switch 1 is abnormal, by comparing the operating times $T_1$ and $T_2$ or the operating currents $I_2$ and $I_3$ for the motor 10 with the first setting range or the second setting range; therefore, the state of the disconnecting switch 1 can be diagnosed. Still moreover, the operating times $T_1$ and $T_2$ and the operating currents $I_2$ and $I_3$ for the motor 10 are corrected in accordance with the power-source voltage, the ambient temperature, and the operational interval, which are parameters that affect the operating times $T_1$ and $T_2$ and the operating currents $I_2$ and $I_3$, and it is determined whether or not the state of the disconnecting switch 1 is abnormal, by comparing the corrected operating times $T_{11}$ and $T_{21}$ or the operating currents $I_{21}$, and $I_{31}$ with the first setting range or the second setting range; therefore, the state of the disconnecting switch 1 can accurately be diagnosed.

Moreover, by localizing the unit where an abnormality exists, the time for repair and maintenance can be reduced. Furthermore, because, by diagnosing the state of the disconnecting switch 1, the sign of an abnormality in the disconnecting switch 1 can be obtained at an early stage, it is possible to perform well-planned repair and maintenance, and, by checking trend information on the operating currents and the operating times that are stored in relationship to the number of operations, it can be ascertained whether or not the state of the disconnecting switch 1 is stable.

DESCRIPTION OF SYMBOLS

Figure 1:
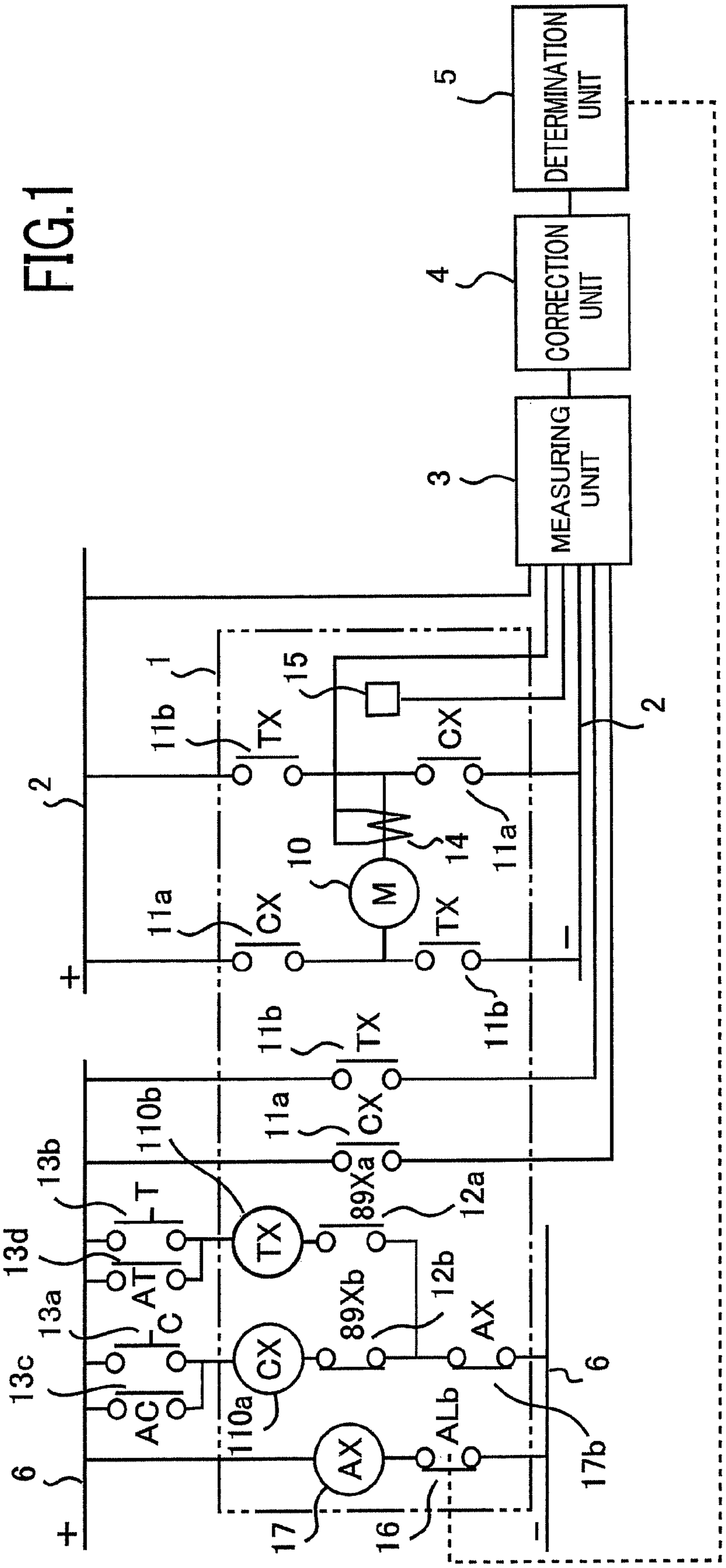
FIG. 1 is a block diagram illustrating a switch-state monitoring device according to the present invention.
Figure 2:
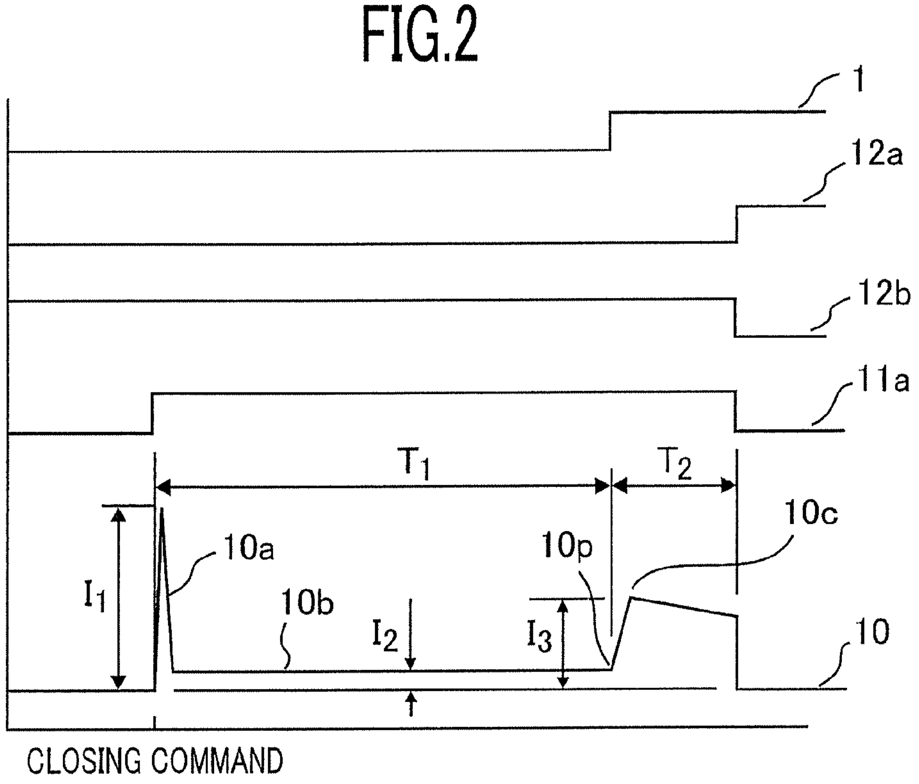
FIG. 2 is a characteristic graph representing an operation characteristic of a disconnecting switch in the normal state.
Figure 3:
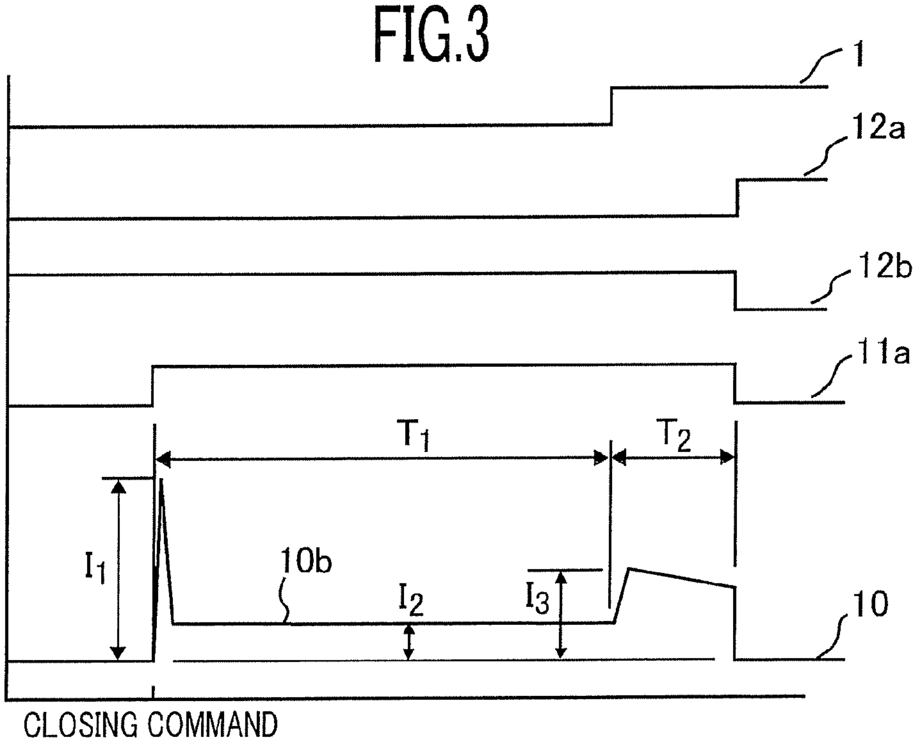
FIG. 3 is a characteristic graph representing an operation characteristic of a disconnecting switch in the case where a moving body thereof is abnormal.
Figure 4:
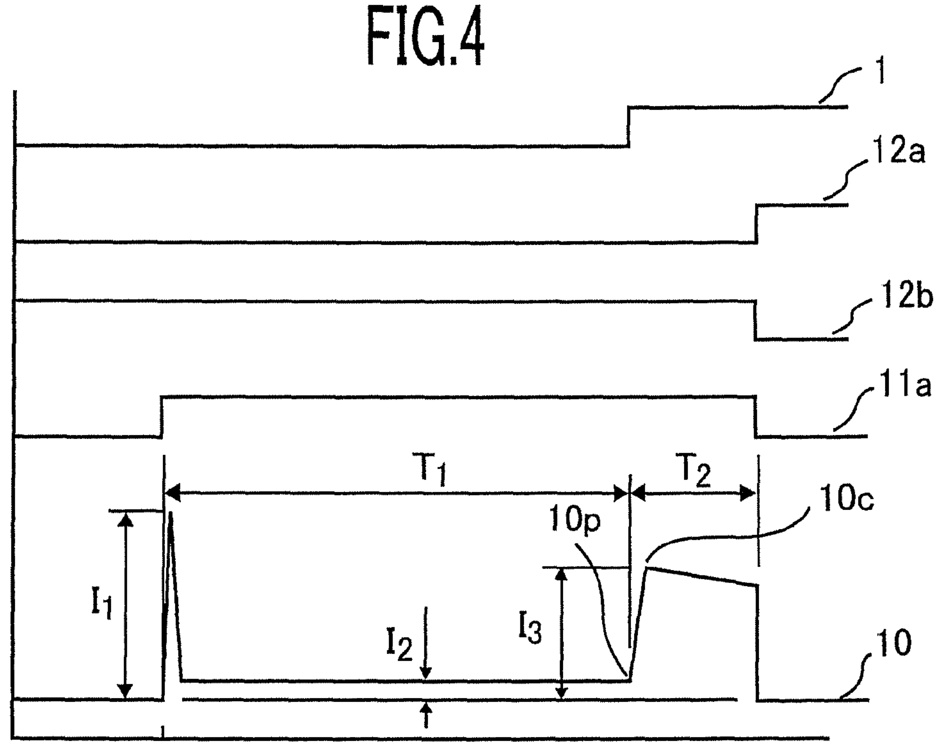
FIG. 4 is a characteristic graph representing an operation characteristic of a disconnecting switch in the case where a main-circuit contact thereof is abnormal.
Figure 5:
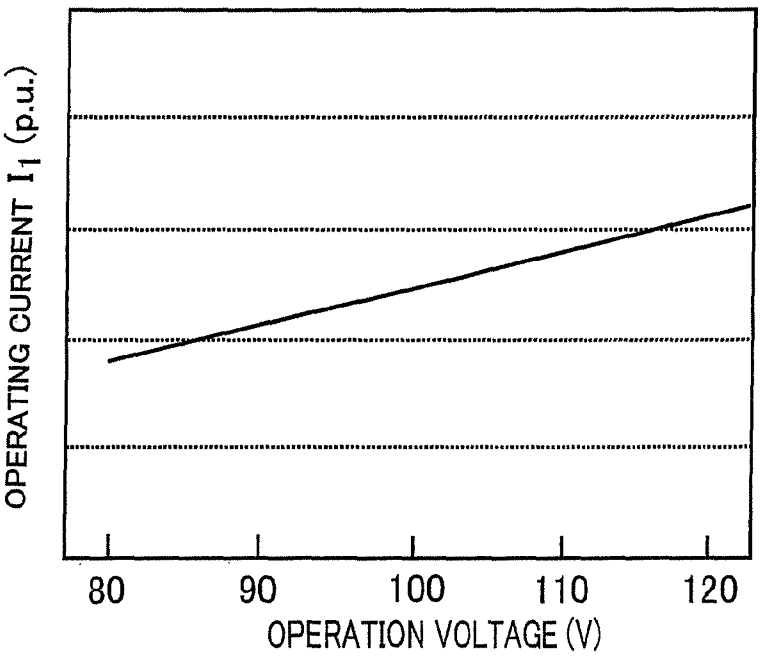
FIG. 5 is a characteristic graph representing the relationship between the voltage of an operation power source and the peak value of a rising current when a motor is activated.
Figure 6:
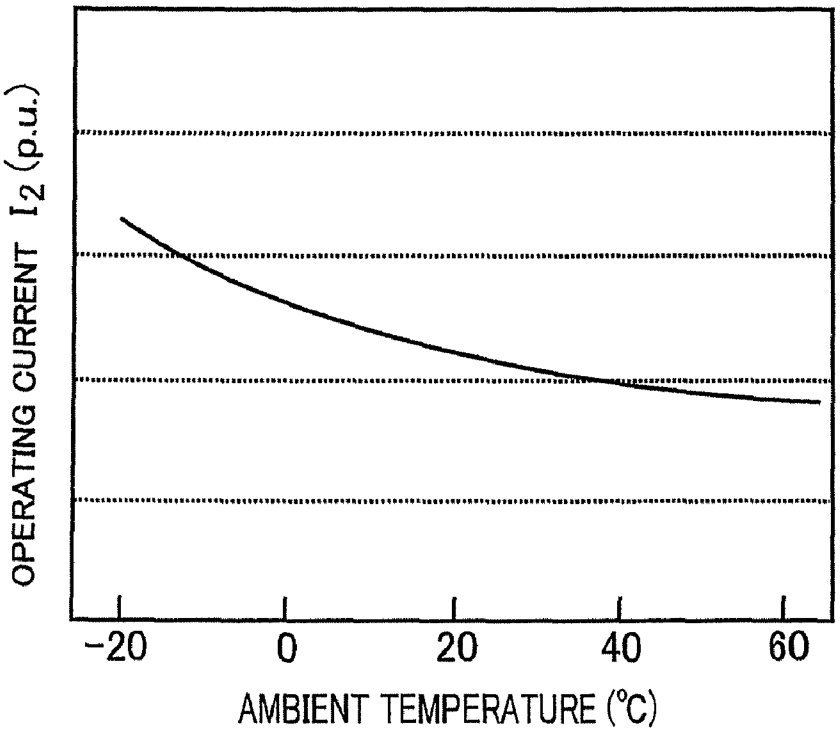
FIG. 6 is a set of characteristic graphs representing the relationship between an ambient temperature and an operating current and the relationship between an ambient temperature and an operating time.
Figure 6:
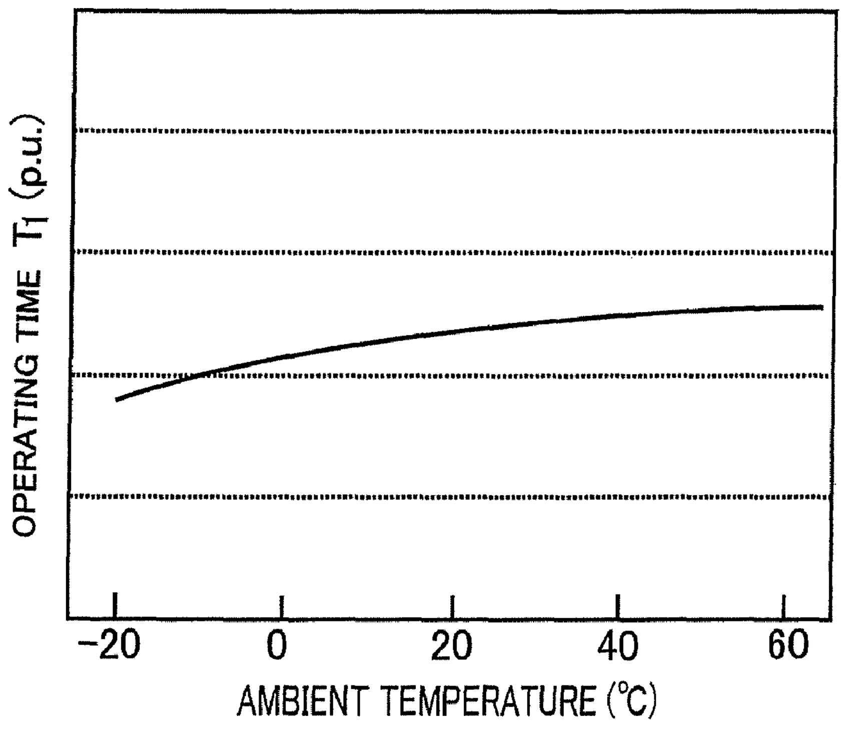
Figure 7:
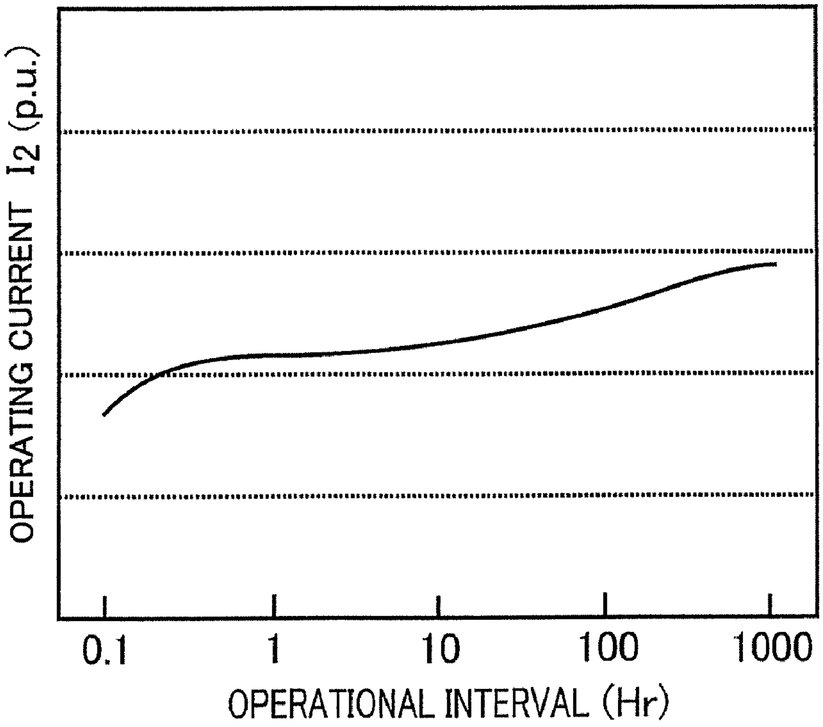
FIG. 7 is a set of characteristic graphs representing the relationship between an operational interval and an operating current and the relationship between an operational interval and an operating time.
Figure 7:
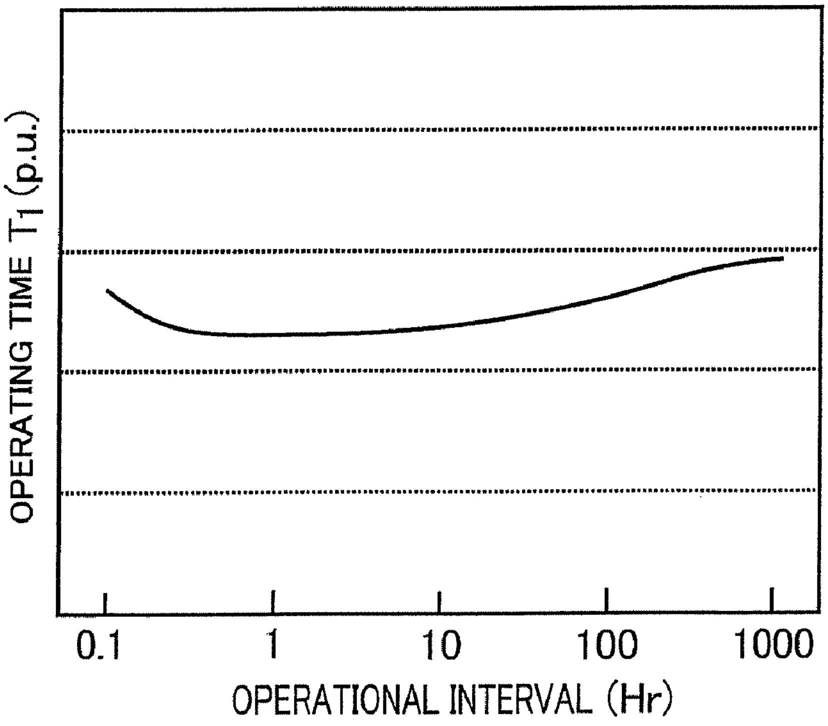
Figure 8:
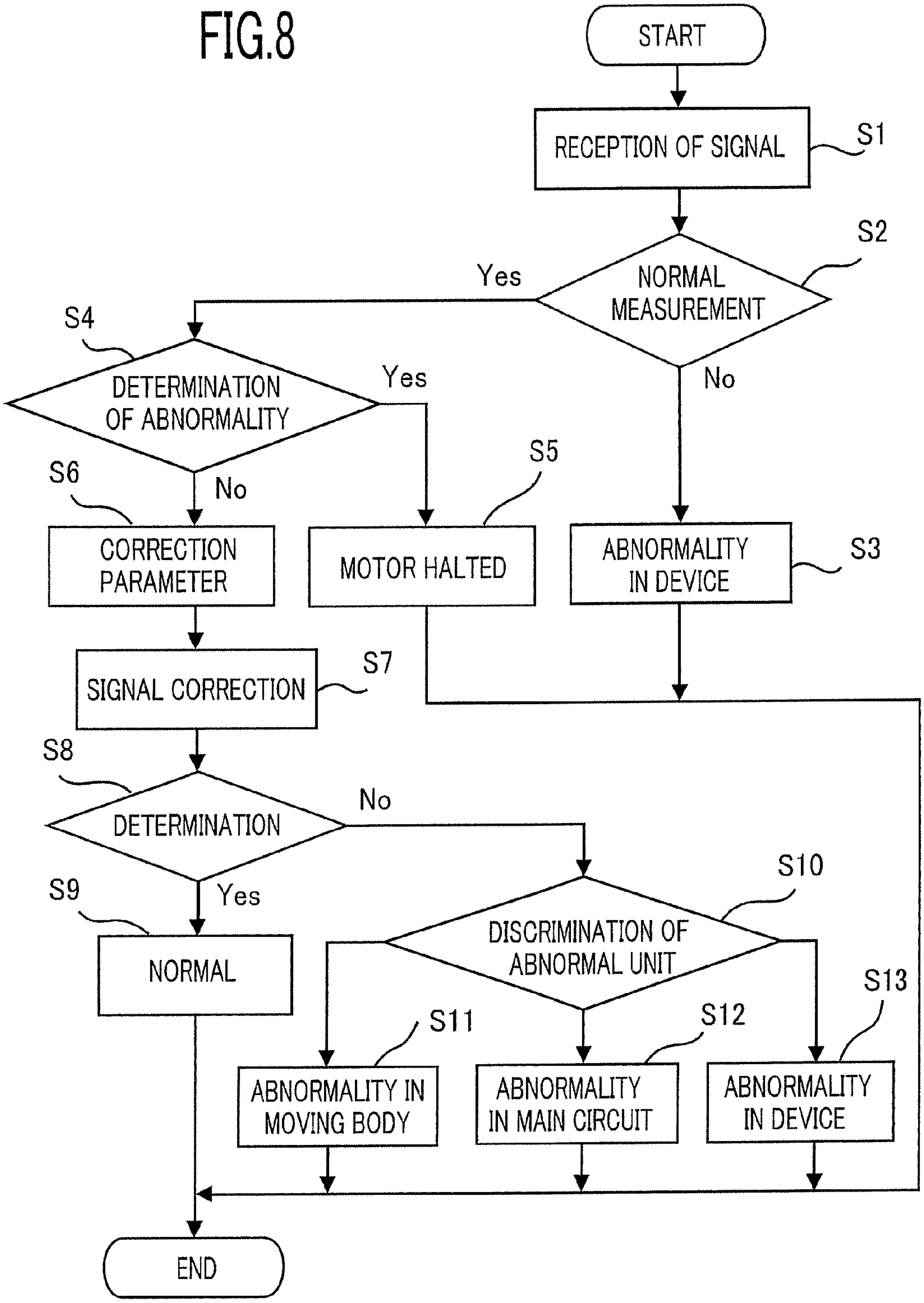
FIG. 8 is a flowchart representing the operation of a switch-state monitoring device according to Embodiment 1.

1. DISCONNECTING SWITCH
2. OPERATION POWER SOURCE
3. MEASURING UNIT
4. CORRECTION UNIT
5. DETERMINATION UNIT
6. CONTROL POWER SOURCE
10. MOTOR
11*a*. MOTOR-OPERATION-CIRCUIT SWITCH
11*b*. MOTOR-OPERATION-CIRCUIT SWITCH
12*a*. AUXILIARY a-CONTACT
12*b*. AUXILIARY b-CONTACT
13*a*. CONTACT CLOSING BUTTON
13*b*. OPENING BUTTON
13*c*. SELF-HOLDING CONTACT
13*d*. SELF-HOLDING CONTACT
14. CURRENT TRANSFORMER
15. TEMPERATURE SENSOR
16. ABNORMALITY STOP CONTACT
17. ABNORMALITY STOP COIL
17*b*. ABNORMALITY STOP SWITCH
110*a*. CONTACT CLOSING COIL
10*b*. OPENING COIL

The invention claimed is:

1. A switch-state monitoring device for a switch that opens and closes a main circuit by use of a motor, the switch-state monitoring device comprising:

an operating time measuring means for detecting an operating time for the motor when the switch is opened or closed;

a first determination means for comparing an operating time for the motor detected by the operating time measuring means with an continuous-operating-capable setting time for the motor and determining whether or not the operating time for the motor has exceeded the continuous-operating-capable setting time;

a protection means for halting energization for the motor, in the case where, based on an output of the first determination means, it is determined that the operating time for the motor has exceeded the continuous-operating-capable setting time;

a second determination means for determining whether or not the operating time for the motor detected by the operating time measuring means has fallen outside an setting range with which it is determined whether or not an abnormality exists in the switch; and an output means for outputting an abnormality in the switch in the case where, based on an output of the second determination means, it is determined that the operating time for the motor has fallen outside the setting range.

2. The switch-state monitoring device according to claim 1, wherein, in the case where the operating time for the motor detected by the operating time measuring means has fallen outside the setting range with which it is determined whether or not an abnormality exists in the switch, the second determination means determines whether the operating time has exceeded the upper limit value or the lower limit value of the setting range, and wherein an abnormal unit discrimination means discriminates an abnormal unit in the switch, based on the output of the second determination means.

3. The switch-state monitoring device according to claim 1, further comprising:

a parameter detection means for detecting the value of a parameter that affects an operating time for the motor; and an operating time correction means for correcting an operating time for the motor detected by the operating time measuring means, in accordance with the difference between a value detected by the parameter detection means and the reference value for the parameter, wherein an operating time corrected by the operating time correction means is utilized for determining in the second determination means whether or not the operating time has fallen outside the setting range.

4. The switch-state monitoring device according to claim 3, wherein the parameter detection means includes any one of a power source voltage detection means for detecting a power source voltage supplied to the motor, an operational interval detection means for detecting an operational interval for the switch, and a temperature detection means for detecting an ambient temperature around the motor.

5. A switch-state monitoring device for a switch that opens and closes a main circuit by use of a motor, the switch-state monitoring device comprising:

an operating current detection means for detecting an operating current for the motor when the switch is opened or closed;

a first determination means for comparing an operating current for the motor detected by the operating current detection means with an operating-capable setting current value for the motor and determining whether or not the operating current for the motor has exceeded the operating-capable setting current value;

a protection means for halting energization for the motor, in the case where, based on an output of the first determination means, it is determined that the operating current for the motor has exceeded the operating-capable setting current value;

a second determination means for determining whether or not the operating current for the motor detected by the operating current detection means has fallen outside an setting range with which it is determined whether or not an abnormality exists in the switch; and an output means for outputting an abnormality in the switch in the case where, based on an output of the second determination means, it is determined that the operating current for the motor has fallen outside the setting range.

6. The switch-state monitoring device according to claim 5, wherein, in the case where an operating current for the motor detected by the operating current detection means has fallen outside the setting range with which it is determined whether or not an abnormality exists in the switch, the second determination means determines whether the operating current has exceeded the upper limit value or the lower limit value of the setting range, and wherein an abnormal unit discrimination means discriminates an abnormal unit in the switch, based on the output of the second determination means.

7. The switch-state monitoring device according to claim 5, further comprising:

a parameter detection means for detecting the value of a parameter that affects an operating current for the motor; and an operating current correction means for correcting an operating current for the motor detected by the operating current detection means, in accordance with the difference between a value detected by the parameter detection means and the reference value for the parameter, wherein an operating current corrected by the operating current correction means is utilized for determining in the second determination means whether or not the operating current has fallen outside the setting range.

8. The switch-state monitoring device according to claim 7, wherein the parameter detection means includes any one of a power source voltage detection means for detecting a power source voltage supplied to the motor, an operational interval detection means for detecting an operational interval for the switch, and a temperature detection means for detecting an ambient temperature around the motor.

* * * * *